Aug. 9, 1966  K. R. BOYDELL ETAL  3,265,004
GEAR PUMPS AND MOTORS
Filed Jan. 28, 1965

INVENTORS
KENNETH R. BOYDELL
BY CEDRIC D. WEAVER

Orland M. Christensen
ATTORNEY

# United States Patent Office 3,265,004
Patented August 9, 1966

3,265,004
GEAR PUMPS AND MOTORS
Kenneth R. Boydell, Tewkesbury, and Cedric D. Weaver, Shurdington, near Cheltenham, England, assignors to Dowty Hydraulic Units Limited, Cheltenham, England, a British company
Filed Jan. 28, 1965, Ser. No. 428,699
Claims priority, application Great Britain, Feb. 6, 1964, 5,097/64
9 Claims. (Cl. 103—126)

This invention relates to gear pumps and motors of the kind in which bushes, which carry those shafts formed on one and the same side of the intermeshing gears for partly supporting those gears for rotation, are subjected to the delivery pressure (in the case of a pump) or supply pressure (in the case of a motor) upon their end faces remote from the side faces of the gears adjacent the bushes, in a manner such that the resultant pressure differential across the bushes urges them into substantial sealing engagement with those side faces. The bushes may be separate or may be formed as a single block. Such a gear pump or motor is hereinafter referred to as "a gear pump or motor of the kind described."

According to this invention there is provided a gear pump or motor of the kind described, wherein the driving shaft (in the case of a pump) or the driven shaft (in the case of a motor) is so reduced in diameter along that part thereof supported by its bush as to permit the internal diameter of that bush to be correspondingly reduced towards its end portion remote from the associated gear, whereby the area of the end face subjected to the said delivery or supply pressure is such in relation to the area of the opposite face of the bush as to afford the required pressure differential for urging the bush into substantial sealing engagement with the adjacent side face of the gear. In this way with bushes where a portion of the end face is deliberately isolated from the said delivery or supply pressure in order to obviate a tilting tendency of the bush (otherwise caused by the fact that a portion of the said opposite face is, in unbalanced manner, subject to low pressure with the remainder of the face subject to high pressure), the reduction in the internal diameter of the bush gives such additional area of said end face as to compensate for the loss in pressurized area due to the said deliberately-isolated portion.

Figure 1:
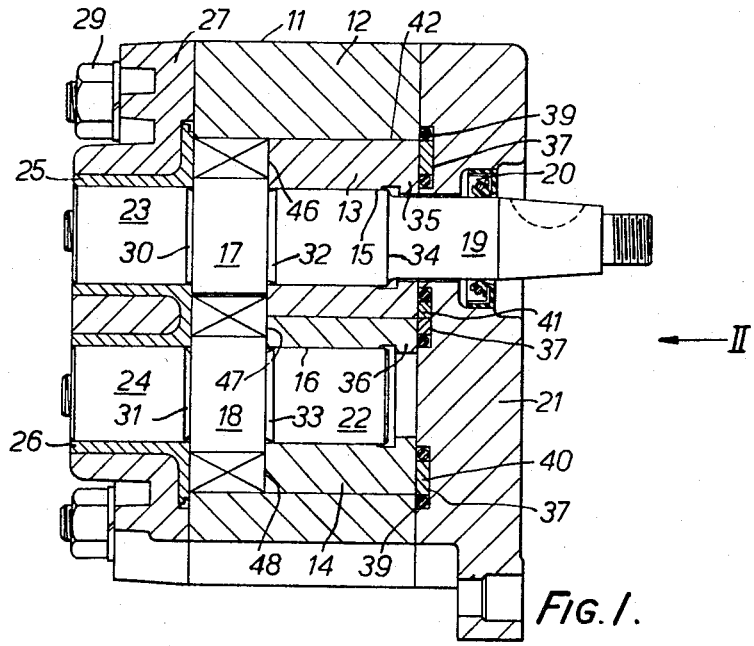
Figure 2:
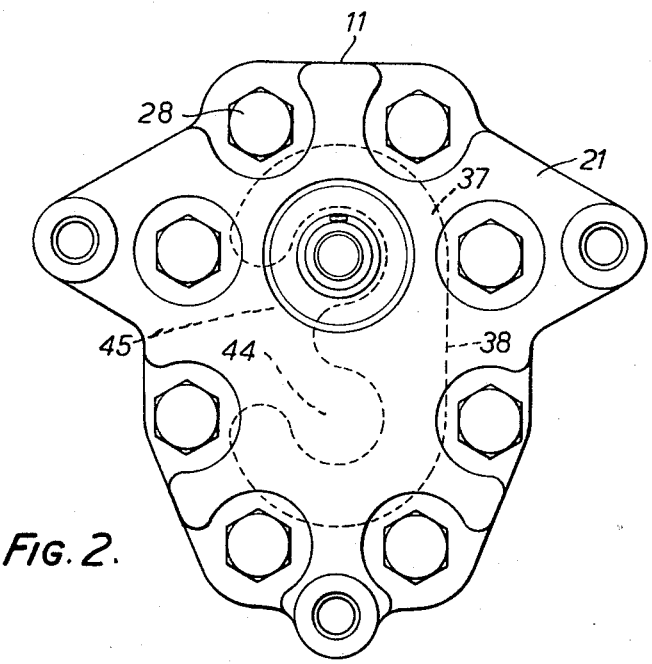

One embodiment of the invention will now be particularly described with reference to the accompanying drawings, of which, FIGURE 1 is a cross-section of a gear pump, and,
FIGURE 2 is a view of the gear pump shown in FIGURE 1, taken in the direction of the arrow II.

Referring to the drawings, a gear pump 11 comprises a central casing 12 which houses two bushes 13 and 14. The two bores 15 and 16 thereby provided, respectively assist in supporting for rotation the intermeshing driving gear 17 and idler gear 18. The driving gear 17 is provided with a shaft 19 (the driving shaft) which extends to the right in the drawing through a seal 20 carried in a closure plate 21. The idler gear 18 has a stub shaft 22 extending to the right in the drawing part-way along the length of the bore 16.

The gears 17 and 18 have respective stub shafts 23 and 24 extending to the left in the drawing, being respectively supported in bushes 25 and 26. These bushes together are formed as a single block carried in encastre manner in a second closure plate 27, the first closure plate 21, the central casing 12 and the second closure plate 27 being held together by eight set bolts 28 passing through them, and nuts 29.

The stub shafts 23 and 24 are each under-cut at 30 and 31 immediately adjacent the left-hand end faces of the gears 17 and 18 respectively. Similarly, the shaft 19 and the stub shaft 22 are also under-cut at 32 and 33 immediately adjacent the right-hand end faces of the gears 17 and 18 respectively.

The shaft 19 is reduced in diameter at 34 to enable the diameter of the bore 15 to be reduced at its end portion remote from the gear 17, thus forming a shoulder 35. Similarly, the diameter of the bore 16 is reduced, the stub shaft 22 however terminating just short of the shoulder 36 produced by this reduction.

That face of the closure plate 21 adjacent the bushes 13 and 14 is provided with a recessed portion 37 of a shape generally indicated by the dotted line in FIGURE 2. This recessed portion 37 is bounded by a sealing ring 39 of continuous form and of circular cross-section. Pressure plates 40 and 41 of suitable shape are so provided within the recessed area bounded by the sealing ring in order to hold the sealing ring in place.

In operation of the pump, leakage of hydraulic liquid at delivery pressure occurs from the tips of the teeth along the outer surface 42 of the bushes 13 and 14. This liquid reaches the recessed portion 37 and is unable to escape therefrom by virtue of the sealing ring 39. However, the pressure built up is effective upon the end faces of the bushes 13 and 14 adjacent the recessed portion over the area enclosed by the sealing ring 39.

Further, a very small leakage of hydraulic liquid occurs from the roots of the gear teeth down the right-hand faces in FIGURE 1 of the gears and along the shafts 19 and 22 in a direction to the right in FIGURE 1. In consequence, a pressure drop is produced down the faces and along the shafts, and the overall effect, taking into account the delivery pressure condition applied to the area enclosed by the sealing ring 39, is to apply hydraulic loading to the bushes 13 and 14 of such magnitude as to hold the left-hand faces of the gears in substantial sealing engagement with the bushes 25 and 26 and to hold the bushes 13 and 14 also in substantial sealing engagement with the right-hand faces of the gears. The engaging force, however, is such that whilst adequate sealing is maintained, excessive friction with undue generation of heat is not set up.

The recessed portion 37 is so shaped, with zones 44 and 45 unpressurised, in order to obviate a tilting tendency of the bushes 13 and 14, otherwise caused by the fact that a portion of the faces 46, 47 and 48 of the bushes adjacent the gears during operation are subjected, in unbalanced manner, to low pressure, while the remainder of these faces are subject to high pressure. Thus, since the portions 44 and 45 have been so isolated, the effective area for pressure loading the end faces of the bushes 13 and 14 remote from the gears is rather restricted in size. Hence, in order to provide an area sufficiently large to obtain a pressure differential across the block appropriate to the desired loading, the shoulders 35 and 36 have been formed in the bores 15 and 16, this requiring reduction in the diameter of the shaft 19 at a point along its length within the bore 15.

In alternative embodiments, the invention is with advantage employed in gear motors.

We claim as our invention:

1. A gear pump or motor of the kind in which bushes, which carry those shafts formed on one and the same side of the intermeshing gears for partly supporting those gears for rotation, are subjected to delivery pressure (in the case of a pump) or supply pressure (in the case of a motor) upon their end faces remote from the side faces of the gears adjacent the bushes, in a manner such that the resultant pressure differential across the bushes urges them into substantial sealing engagement with those side faces, wherein the driving shaft (in the case of a pump)

or the driven shaft (in the case of a motor) is so reduced in diameter along that part thereof supported by its bush as to permit the internal diameter of that bush to be correspondingly reduced towards its end portion remote from the associated gear, whereby the area of the end face subjected to the said delivery or supply pressure is such in relation to the area of the opposite face of the bush as to afford the required pressure differential for urging the bush into substantial sealing engagement with the adjacent side face of the gear.

2. A gear pump or motor as claimed in claim 1, wherein the bush or bushes of the other gear or gears of the pump or motor which are subjected to delivery or supply pressure are reduced in internal diameter in a manner similar to the bush supporting the driving or driven shaft.

3. A gear pump or motor as claimed in claim 1, wherein the areas of the said end faces of the bushes subjected to delivery or supply pressure are together defined by a sealing ring interposed between the bushes and an end closure plate of the pump or motor.

4. A gear pump or motor as claimed in claim 3, wherein the closure plate is recessed on that face thereof adjacent the bushes, the recess being common to both bushes and of such shape as to afford fluid-pressure loading of the bushes upon such portion thereof as to oppose tilting tendency to which the bushes in operation are subjected.

5. A gear pump or motor as claimed in claim 4, wherein the sealing ring is of continuous form being seated within the recess and around the perimeter edge portion thereof.

6. A gear pump or motor as claimed in claim 5, wherein the sealing ring is supported upon a pair of plates together conforming in shape with the recess and fitting therein.

7. A gear pump or motor as claimed in claim 3, wherein the sealing ring is of circular cross-section.

8. A gear pump or motor as claimed in claim 1, wherein the driving or driven shaft is formed integrally with its respective gear.

9. A gear pump or motor, as claimed in claim 1, wherein said bushes, which are subjected to delivery or supply pressure, are separately formed.

References Cited by the Examiner

UNITED STATES PATENTS

| | | | |
|---|---|---|---|
| 2,472,031 | 5/1949 | Wichorek | 103—126 |
| 2,649,740 | 8/1953 | Murray et al. | 103—126 |
| 2,842,066 | 7/1958 | Hilton | 103—126 |
| 2,932,254 | 4/1960 | Booth et al. | 103—126 |
| 3,055,307 | 9/1962 | Thrap | 103—126 |

FOREIGN PATENTS

| | | |
|---|---|---|
| 1,231,347 | 4/1960 | France. |
| 523,969 | 4/1955 | Italy. |

MARK NEWMAN, *Primary Examiner.*

W. J. GOODLIN, *Assistant Examiner.*